United States Patent Office 3,253,404
Patented May 31, 1966

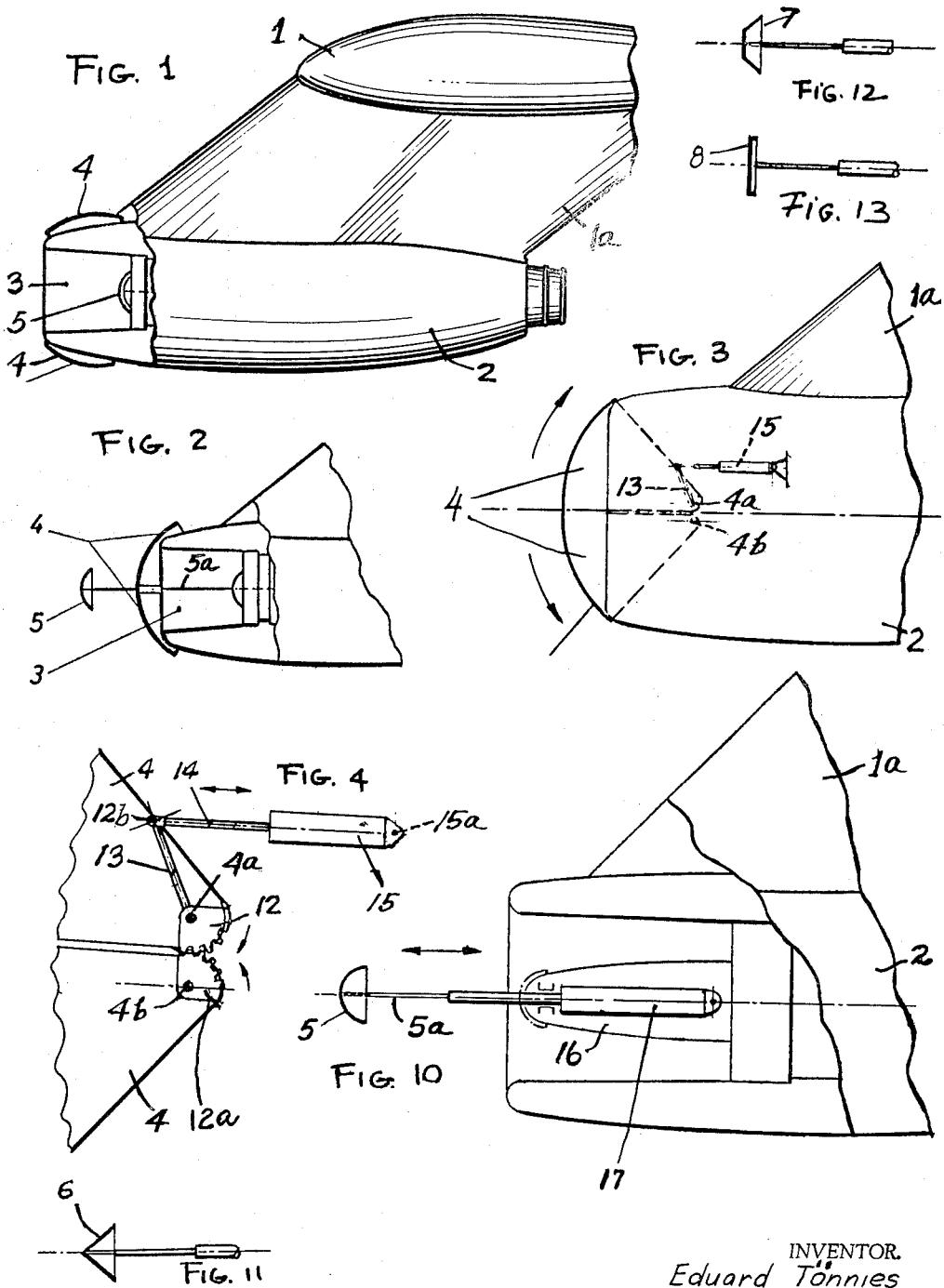

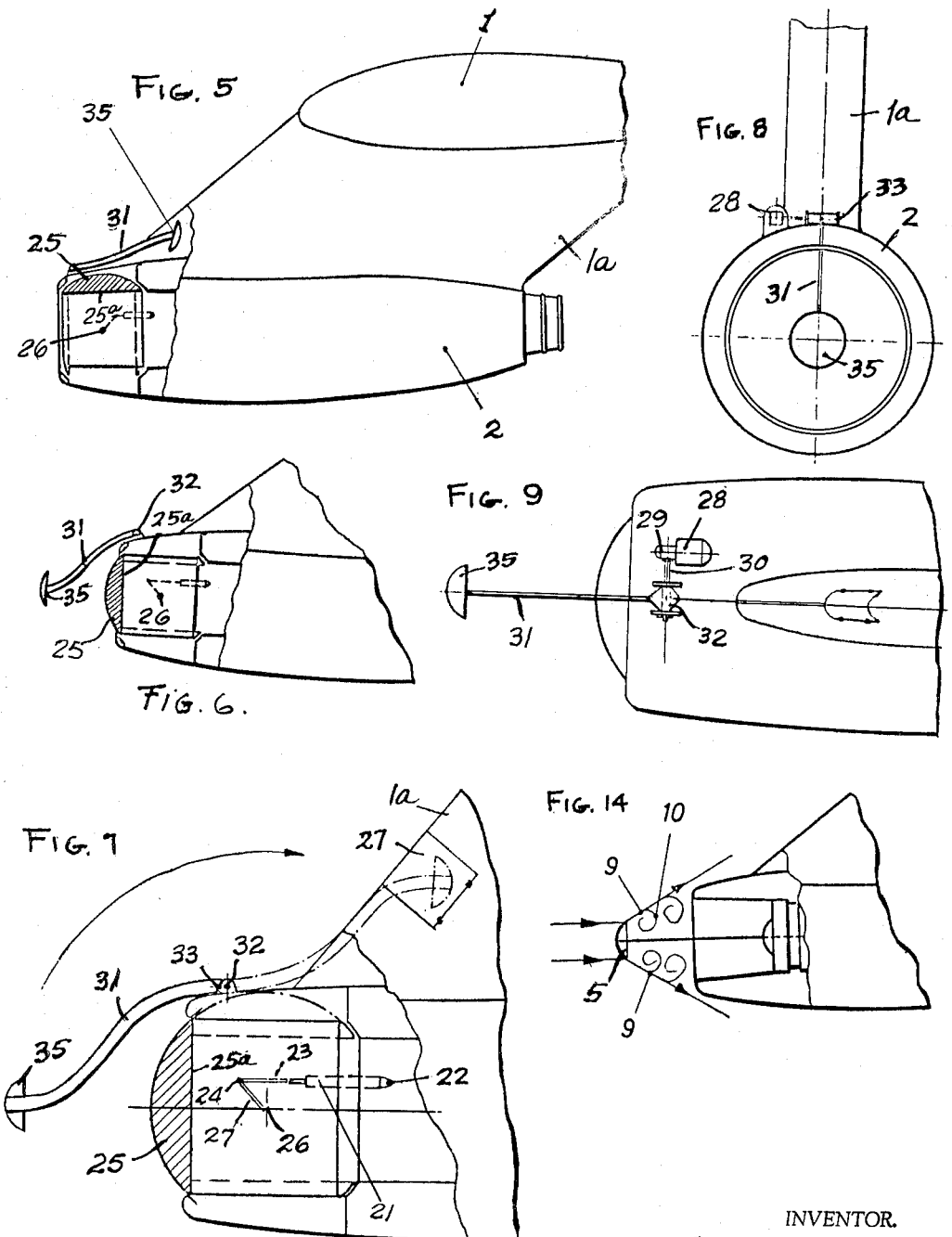

3,253,404
APPARATUS FOR AND METHOD OF PREVENTION OF ICE FORMATION ON AIRCRAFT ENGINE AIR INLET ORIFICES
Eduard Tönnies, Hamburg-Rissen, Germany, assignor to Hamburger Flugzeugbau Gesellschaft mit beschränkter Haftung
Filed May 28, 1962, Ser. No. 197,957
Claims priority, application Germany, June 2, 1961, H 42,766
5 Claims. (Cl. 60—35.6)

This invention relates to an apparatus for and method of prevention of ice formation at the outer or leading annulus, or surface of aircraft orifices.

More particularly it is a purpose of the invention to provide means whereby a condition of air turbulence is created over and about the edge, surface, or annulus of the air inlet of aircraft engines of the turbojet or ramjet types, which is unfavorable to ice formation.

Another object is to provide means, as mentioned in the preceding paragraph, which is readily adaptable to adjustment either by hand or power control, between a retracted position within the wing or strut of an aircraft, and an extended or operating position.

A further object is to provide, in combination with means as indicated in the preceding paragraph, means by which the air inlet of engines of the types mentioned, and which are used only intermittently, as at take-off, may be closed when not in use.

A still further object is to provide a closure as previously mentioned which, in closed position, that is, when the engine or other mechanism is not in use, prevents the entrance therein of objects which may otherwise be carelessly thrown into the intake when the craft is at airports, the entrance of birds when the craft is in flight, which prevents windmilling of the rotor in the case of turbojet engines, and excessive cooling at high altitudes.

Yet another object is to provide a closure of the type mentioned, combined with a device creating turbulence at or about the leading edge or annulus of the air intake to prevent or inhibit the formation of ice on and about the edge, so that the closure when in closed position is kept free and clear of ice and is thus maintained at all times in condition for free and unrestrained movement to open position.

Still another object is to provide a closure, as aforesaid, which is facilely adapted to operation by power means under control of the pilot or flight engineer while the craft is in flight or at rest.

Another object is to provide a combination as explained in the next preceding paragraph in which both the turbulence-creating means and the closure elements are easily adaptable to simultaneous conjoint power control.

Yet another object is to provide a closure which may be adapted to any aircraft attachment or auxiliary having an inlet for ambient air, alone or in combination with means to prevent fouling of the same by ice accumulations.

Other objects and advantages of the invention will readily occur to those skilled in the art, after a study of the following detailed description, in connection with the accompanying drawing.

In the drawings:

FIGURE 1 is an elevation, partly in section, of a gas-turbine or ramjet aircraft engine equipped with one embodiment of the invention wherein the parts are in the positions they assume during operation of the engine;

FIGURE 2 is a view corresponding to FIGURE 1 but showing the parts of the invention in the positions they assume when the engine is not operating;

FIGURE 3 is a detail view to an enlarged scale, showing the embodiment of FIGURES 1 and 2, and the means for actuating the closure between the closed position shown at FIGURE 2 and the open position of FIGURE 1;

FIGURE 4 is a detail view to a still larger scale than FIGURE 3, of the closure, operating and control means;

FIGURE 5 is a view corresponding to FIGURE 1, of a modified construction with the parts in the position they assume when the engine is operating;

FIGURE 6 shows the modification of FIGURE 5 with the parts in the positions assumed when the engine is not operating;

FIGURE 7 is a detail sectional elevation showing the modification of FIGURE 6, to an enlarged scale, and the mechanism by which the closure is swung between the inlet-closure position shown in solid lines, and the inlet-opening position shown in dot-dash lines;

FIGURE 8 is an end elevation looking from the front, of power-actuated means for pivoting the closure shell segments, as in FIGURE 1, between open and closed positions and simultaneously retracting and advancing the turbulence-producing body;

FIGURE 9 is a side elevation corresponding to FIGURE 8, with the parts in the position shown upon FIGURE 2;

FIGURE 10 is a detail sectional view showing to a scale enlarged over FIGURE 2, the mechanism for advancing and retracting the turbulence-producing body;

FIGURES 11, 12 and 13 show, respectively alternative forms of the hermispherical body depicted upon FIGURE 10; and FIGURE 14 is a view corresponding to FIGURE 2, but with intake orifice omitted, showing diagrammatically how, with the vane body extended, air turbulence about the annular leading edge of the engine housing is created and a large part of the air otherwise entering the engine, is deflected exteriorly thereof.

Referring in detail to the drawings, 1 identifies a portion of the wing of an aircraft to which a jet motor 2 is connected by means of a strut 1a. As is usual in such installations the motor has a casing defining an air inlet orifice 3. It is assumed that the motor is used largely for take-off and other auxiliary assistance and, in general, is not in operation in normal flight of the craft.

Referring more particularly to FIGURES 3 and 4, a pair of spherical segmental shells 4 are pivoted to the engine housing on respective parallel axis 4a, 4b, normal to the plane of the figure, for movement from the closed position of FIGURES 2 and 3, to the open position shown upon FIGURE 1. From FIGURE 4 it is noted that each of the shells is provided with a gear segment 12 and 12a, respectively, which intermesh to constrain the shells to equal and opposite rotation. A lever 13 is fixed to segment 12, radially of axis 4a and its distal end is pivotally connected at 12b with the corresponding end of the piston rod 14 of a hydraulic pressure cylinder 15, pivoted at 15a to the motor casing or to a bracket, not shown, fixed therewith. The cylinder is double acting and by valve means, not shown, fluid under pressure may be admitted to either end while simultaneously exhausting fluid from the other end, whereby the piston in the cylinder may be actuated to move the segmental spherical shells between the open position of FIGURE 1 and the closed position of FIGURES 2, 3 and 4.

Reverting to FIGURES 1 and 2, there is shown an air-flow controlling body 5 carried at the forward end of a rod 5a. This rod is mounted for axial, fore and aft sliding within the central cone of the engine, from a retracted position shown at FIGURE 1, wherein it is within the inlet orifice 3, to a forward position shown at FIGURE 2, wherein it is extended exteriorly of the orifice. Preferably actuation of assembly 5, 5a between the aforesaid positions is effected by a hydraulic cylinder, such as 17, FIGURE 10, and which is interconnected by hydraulic piping, with cylinder 15 so that body 5 is extended and shells 4 moved to the closed position in sequence, under control of a single valve.

Thus, when the parts are in the position shown upon FIGURE 2, air is effectively prevented from entering inlet orifice 3 and windmilling and excessive drag and cooling are prevented. At the same time, vane 5 induces a turbulence of the air flowing over and about the leading edge of the engine pod, as indicated in FIGURE 14, to thereby inhibit the formation of ice thereon. It is intended also that the controls may be such as to enable shells 4 to be pivoted to the closed position shown at FIGURE 2, but without a corresponding movement of vane 5 to the forwardly extended position. In this way the inlet orifice of the motor may be closed when the craft is at rest, to protect the interior parts of the engine against damage, as by the throwing of foreign objects into the intake.

FIGURES 5, 6 and 7 show a modification wherein the orifice closure 25 is made in one piece and is mounted for pivotal movement about a transverse axis 26 from a first or open position shown at FIGURE 5, to a second or closed position shown upon FIGURES 6 and 7. In this species the closure member has an outer or exterior surface conforming generally to a portion of a sphere centered on and centrally of axis 26 and of a radius and area such that it forms a substantially continuous, complete, smooth covering for the inlet orifice when in the second position identified. When in the first position, FIGURE 5, the inner surface 25a of the closure member forms a substantially continuous part of the surface of the orifice, flush therewith. Since the engine is not in use when the closure is in the position of FIGURES 6 and 7, the area of the surface of the orfice occupied by surface 25a when in the position of FIGURE 5, may be omitted.

Actuation of closure member 25 between the positions identified, is effected by a hydraulic cylinder 21, pivoted to the engine casing at 22, FIGURE 7, and having a piston and piston rod 23. The rod is pivotally connected at its distal end, at 24, to the corresponding end of a lever 27 fixed at its inner end with member 25, radially of axis 26. A manually or automatically actuated valve, not shown, will control the admission of fluid under pressure to one side or the other of the piston within cylinder 21, to effect movement of the closure member into the selected first or second position.

In the model being described, the cone or turbulence-producing body, identified at 35 is fixed to the distal end of a rod 31 having its inner end pivoted at 32 in a bracket 33 fixed to the engine casing, preferably at the upper surface thereof. The rod is curved, as shown, so that when in the forwardly-extended limiting position of FIGURE 7, vane 35 is spaced forwardly of closure 25 and substantially centered upon the axis of the engine intake orifice. In this position the vane acts to produce turbulence of the air passing over and about the leading edge defining the intake opening and thus inhibits the formation of ice which might otherwise seriously hamper, or prevent, pivoting of the closure to the open or operating position.

When swung backwarly in an arc lying in a vertical plane, as indicated by the arrow, FIGURE 7, to the position shown in dot-dash lines, arm 31 extends rearwardly and the vane is housed within a recess 27 in the strut 1a.

FIGURES 8 and 9 show in detail, a power-driven means for pivoting arm 31 between the two limiting positions previously identified. A reversible servo motor 28 is fixedly mounted upon the engine casing and, when energized, drives a speed-reducing unit 29 and thereby a transverse shaft 30 fixed with the inner end of rod or arm 31. The servo motor will be under control of a two-way or reversing switch which may be correlated with, or connected with the valve controlling the admission of pressure fluid to cylinder 21, so that the closure 25 and vane 35 are by a single manual adjustment, moved between the limiting positions shown upon FIGURES 5 and 6.

FIGURE 10 shows in greater detail, power means by which the air vane or turbulence-creating body may be axially extended and retracted. The rod 5a, mounting deflector vane 5 at its forward or distal end, is connected in axially aligned relation with the piston within hydraulic power cylinder 17 having its rearward end pivoted to the rearward portion of the entrance or nose cone 16 of the engine. The vane or cap 5 is shaped to fit over the forward end or tip of the cone. Cylinder 17 is of the double-acting type so that when fluid under pressure is introduced, by means not shown, to the rearward side of the piston in cylinder 17, the vane is thrust forwardly to, and held, in the position shown. When fluid under pressure is introduced into the cylinder at the forward side of the piston therein, the vane is retracted to the dot-dash position indicated.

FIGURES 11, 12 and 13 show alternative forms which the vane 5 of FIGURES 1, 2, 5, 6 and 7 may take. In FIGURE 11 the vane 6 is in the form of a hollow right cone; in FIGURE 12 it is in the form of a truncated hollow cone 7; and in FIGURE 13 it is in the form of a simple flat circular plate 8.

The mechanical operation of the invention will be clear from the foregoing description. During take-off, for example, when the added thrust of the engine is required, the parts are in the position of FIGURE 1 or FIGURE 5. After altitude has been attained and the engine is not required for normal cruising speed, it is cut out and thereafter the pilot or flight engineer actuates the controls in the case of FIGURE 10, to introduce fluid under pressure to cylinder 17 and thereby thrust vane 5 forwardly and hold it in fixed advanced position and thereafter to introduce fluid under pressure to cylinder 15 to pivot the cover members 4 to the position shown upon FIGURE 2, wherein they close about rod 5a and obturate the air intake opening. The air is thereby deflected rearwardly in the form principally of a hollow cone with apex at the vane and at an apex angle such that the air flows externally about the intake opening while a turbulent ring of air is created substantially at and coextensive with the edge of the intake opening. As previously explained, this turbulence creates a condition unfavorable to ice formation, so that the cover is left free for return to open position when operation of the engine is again required.

The operation and function of the species of FIGURES 5, 6 and 9 will be obvious from the foregoing description.

As suggested by FIGURE 10, the vane alone is useful and, as depicted upon FIGURE 14, operates to form the hollow cone of air and thereby prevent a major portion of the air stream which would otherwise enter the engine casing, outwardly and rearwardly about the edge of the intake opening. At the same time the turbulence suggested at 10, FIGURE 14, creates the condition unfavorable to, or inhibiting, ice formation.

Where used on aircraft capable of supersonic speeds, the vane will be adjusted forwardly of the edge of the air intake in accordance with the instantaneous speed, by the admission of more or less pressure fluid into cylinder 17.

The invention finds its greatest utility when the closure and vane are used in combination. The invention is also useful in the protection of other exposed intermittently used intake openings on aircraft such as those for air conditioning.

Numerous alterations, substitutions and modifications will occur to those skilled in the art after a study of the foregoing disclosure. Hence such disclosure should be taken in an illustrative rather than a limiting sense; and it is my desire and intention to reserve all modifications within the scope of the subjoined claims.

What I claim and desire to secure by Letters Patent is:

1. In a jet aircraft engine casing having a longitudinal axis and forming a leading annular edge about said axis to define an air intake opening, a turbulence-creating vane, means mounting said vane to said casing for movement between a first position on said axis forwardly of said edge, and a second position rearwardly of said edge, and closure means for said opening mounted on said casing for pivotal movement about a transverse axis normal to said longitudinal axis, from a first position closing said opening in substantially coplanar relation with said edge, to a second position free and clear of said opening, said vane being in its said first and second positions when said closure means is in its said first and second positions, respectively.

2. In a jet aircraft engine casing, having a central longitudinal axis and forming an annular leading edge extending about said axis in a plane angularly related thereto and forming an air intake for the engine, closure means for said opening comprising first and second like shells each in the form of a portion of a spherical surface, each said shell being pivotable about a respective one of two parallel transverse axes normal to said longitudinal axis, from a first position forwardly over said opening to a second position rearwardly of and externally of said opening, said shells when in first position conjointly forming a continuous convex surface in the form of a segment of a sphere covering said opening, a rod mounted at one end within said casing for axial translation along said longitudinal axis, a vane fixed with the forward end of said rod and translatable therewith, between a first position forwardly of said opening, and a second position retracted within said opening, said vane being in its said first position when said shells are in their said first position, with said vane forwardly of said shells and said rod extending between the meeting edges of said shells.

3. The device recited in claim 2, and means interconnecting said shells and said rod to effect simultaneous operation thereof between said first and second positions.

4. In a jet aircraft engine casing having a longitudinal axis and forming a leading annular edge about said axis to define an air intake opening, an arm pivoted at one end to said casing, at one side of and adjacent said opening, on an axis normal to said longitudinal axis, a vane fixed with the other end of said arm and pivotal therewith from a first position, wherein said vane is forwardly of said opening on said longitudinal axis, and a second position wherein said vane is retracted to a position rearwardly of said opening externally thereof, and closure means for said opening mounted on said casing for pivotal movement about a transverse axis normal to said longitudinal axis, from a first position closing said opening in substantially coplanar relation with said edge, to a second position free and clear of said opening, said vane being in its said first and second positions when said cover means is in its said first and second positions, respectively.

5. The method of protecting, in flight, an unused aircraft jet engine having a casing with a central longitudinal axis and a leading annular edge extending about said axis generally in a plane angularly related thereto, and defining a forwardly-directed air intake opening, comprising, closing said opening with closure means mounted over said opening at said plane, and fixing a vane forwardly of said closure means, on said axis, in position to create air turbulence over and about the periphery of said closure means.

References Cited by the Examiner

UNITED STATES PATENTS

| | | | |
|---|---|---|---|
| 2,674,420 | 4/1954 | Johnson | 244—135 X |
| 2,737,015 | 3/1956 | Wright | 60—35.6 |
| 2,848,181 | 8/1958 | Landers | 244—58 |
| 2,928,497 | 3/1960 | Stockdale | 30—39.09 X |
| 3,053,488 | 9/1962 | Cox | 60—35.6 X |

FOREIGN PATENTS

| | | |
|---|---|---|
| 620,249 | 3/1949 | Great Britain. |
| 788,787 | 1/1958 | Great Britain. |
| 820,366 | 9/1959 | Great Britain. |

MARK NEWMAN, *Primary Examiner.*

SAMUEL LEVINE, *Examiner.*